United States Patent
Ryynänen

(10) Patent No.: US 7,417,620 B2
(45) Date of Patent: Aug. 26, 2008

(54) HYBRID MAGNET FOR RETARDING HAPTIC APPLICATIONS USING ACTIVE FRICTION BRAKING

(75) Inventor: Matti Kullervo Ryynänen, Helsinki (FI)

(73) Assignee: Nokia Corporation, Espoo (FI)

( * ) Notice: Subject to any disclaimer, the term of this patent is extended or adjusted under 35 U.S.C. 154(b) by 591 days.

(21) Appl. No.: 10/832,110

(22) Filed: Apr. 26, 2004

(65) Prior Publication Data

US 2005/0237314 A1    Oct. 27, 2005

(51) Int. Cl.
G09G 5/00    (2006.01)
(52) U.S. Cl. ...................................................... 345/156
(58) Field of Classification Search .......... 345/156–184
See application file for complete search history.

(56) References Cited

U.S. PATENT DOCUMENTS

| | | | |
|---|---|---|---|
| 5,844,392 | A | 12/1998 | Peurach et al. |
| 5,999,168 | A | 12/1999 | Rosenberg et al. |
| 6,131,097 | A | 10/2000 | Peurach et al. |
| 6,184,868 | B1 | 2/2001 | Shahoian et al. |
| 6,256,011 | B1 | 7/2001 | Culver |
| 6,281,651 | B1 | 8/2001 | Haanpaa et al. |
| 6,300,938 | B1 | 10/2001 | Culver |
| 6,307,285 | B1 | 10/2001 | Delson et al. |
| 6,374,255 | B1 | 4/2002 | Peurach et al. |
| 6,396,232 | B2 | 5/2002 | Haanpaa et al. |
| 6,411,276 | B1 | 6/2002 | Braun et al. |
| 6,448,977 | B1 | 9/2002 | Braun et al. |

FOREIGN PATENT DOCUMENTS

WO    03038800 A1    5/2003

*Primary Examiner*—Amr Awad
*Assistant Examiner*—Michael Pervan
(74) *Attorney, Agent, or Firm*—Ware Fressola, Van Der Sluys and Adolphson LLP

(57) ABSTRACT

This invention describes a method for providing a haptic feedback to a user of a wireless portable device (e.g., a gaming device or a mobile terminal or phone) utilizing a hybrid magnet controlling a friction brake based haptic actuator. This novel hybrid magnet actuator uses a displacement of a permanent magnet assembly relative to a magnet yoke to actively control the friction between the magnetic yoke and an anchor plate made from a magnetic material. This permanent magnet assembly displacement is achieved by using a coil incorporated within said the magnet yoke by applying an electric current of a predetermined direction and/or a predetermined pulse width or repetition rate to the coil.

33 Claims, 4 Drawing Sheets

Anchor plate does not see magnetic field, therfore, there is no holding force

HYBRID MAGNET FOR RETARDING HAPTIC APPLICATIONS USING ACTIVE FRICTION BRAKING

FIELD OF THE INVENTION

This invention generally relates to haptic applications of wireless portable devices and more specifically to utilizing hybrid magnet actuators with active friction braking for facilitating said haptic applications.

BACKGROUND OF THE INVENTION

Active haptic feedback devices, providing various techniques of a sensational feedback to users of such devices, have a broad range of applications applied to a variety of such devices including but not be limited to mouse devices, pointing devices, interface devices, control devices, touchpads, etc. (e.g., see U.S. Pat. No. 6,411,276 "Hybrid Control of Haptic Feedback for Host Computer and Interface Device", by A. C. Braun, et al. and references herein). However, the haptic applications mentioned above (e.g., using roller breaks or pure electromagnetic brakes as haptic actuator means) require a significant energy consumption and have a relatively large size which makes them hardly applicable to miniature and portable applications such as mobile phones. Therefore it is highly desirable to come out with an alternative method to apply active haptic techniques to such low energy consumption and small size applications.

SUMMARY OF THE INVENTION

The object of the present invention is to provide a novel method for a haptic feedback to a user of a wireless portable device (e.g., a mobile gaming device or a mobile terminal or phone) utilizing a hybrid magnet with active friction braking.

According to a first aspect of the invention, a hybrid magnet actuator, responsive to an electric current, for retarding feedback haptic applications using active friction braking, comprises: a magnet yoke; a coil optionally attached to said magnet yoke, for providing a magnetic field inside of said magnet yoke in response to said electric current or in response to terminating said electric current; a permanent magnet assembly, responsive to the magnetic field generated by said coil, for providing a further magnetic field outside of said magnet yoke optionally in response to said electric current; and an anchor plate, responsive to said further magnetic field, wherein the anchor plate, when said further magnetic field is not provided, is not in a physical contact with said magnet yoke and moves freely relative to said magnet yoke, but said anchor plate, when said further magnetic field is provided, is placed in a physical contact with said magnet yoke in response to said further magnetic field and said active friction braking restricting said movement of the anchor plate relative to said magnet yoke is provided by a friction between said anchor plate and said magnet yoke thus facilitating said retarding feedback haptic applications using said active friction braking.

According further to the first aspect of the invention, the electric current may be a pulsed electric current.

Further according to the first aspect of the invention, the permanent magnet assembly may move relative to said magnet yoke in response to said electric current or in response to terminating said electric current. Further, the permanent magnet assembly may move relative to said magnet yoke linearly or rotationally.

Still further according to the first aspect of the invention, the permanent magnet assembly may move relative to said magnet yoke between two stable positions, wherein in a first position of said two stable positions the permanent magnet assembly does not provide the further magnetic field and in a second position of said two stable positions the permanent magnet assembly does provide the further magnetic field. Further, the permanent magnet assembly may move to the first position of said two stable positions when said electric current has a predetermined direction and said permanent magnet assembly may move to the second position of said two stable positions when said electric current has a direction opposite to said predetermined direction. Still further, the permanent magnet assembly may move to the first position of said two stable positions when said electric current has a predetermined pulse width and said permanent magnet assembly may move to the second position of said two stable positions when said electric current has a further predetermined pulse width which is different from the predetermined pulse width.

According further to the first aspect of the invention, the permanent magnet assembly may stay in one stable position relative to said magnet yoke when said electric current is not applied, and may return to said one stable position when said electric current is applied in response to terminating said electric current. Further, the permanent magnet assembly may stay in one stable position relative to said magnet yoke and may provide a predetermined amount of said active friction braking, such that when said current is applied in a predetermined direction, said active friction braking is increased, and when said electric current is applied in a direction opposite to said predetermined direction, said active friction braking is decreased.

According still further to the first aspect of the invention, the anchor plate may move freely relative to said magnet yoke in a rotational fashion, or said anchor plate moves freely relative to said magnet yoke in a linear fashion.

According further still to the first aspect of the invention, the anchor plate may be made from a magnetic material or from a ferromagnetic material.

According yet further still to the first aspect of the invention, the actuator may be a part of a wireless portable device. Further, the actuator may provide a retarding haptic signal indicative of said active friction braking. Still further, the wireless portable device, in response to said retarding haptic signal, may provide a haptic feedback signal or a further haptic feedback signal or both the haptic feedback signal and the further haptic feedback signal to a user and is responsive to a manipulation signal from said user and optionally to a further manipulation user from said user. Yet still further, the user may be further responsive to a video signal from the wireless portable device or an audio signal or to both the video signal and the audio signal. Yet further, the haptic feedback signal or the further haptic feedback signal or both the haptic feedback signal and the further haptic feedback signal may provide a braking sensation. Still yet further, the wireless portable device may be a communication device, a mobile phone, a multimedia terminal, a camera, a PDA-device or a gaming device.

According to a second aspect of the invention, a wireless portable device for providing a haptic feedback signal or a further haptic feedback signal or both the haptic feedback signal and the further haptic feedback signal to a user, comprises: a manipulation input block, responsive to a manipulation signal and to a retarding haptic signal, for providing a haptic feedback signal to the user and for providing a sensor signal; a sensor block, responsive to the sensor signal, for providing a processing input signal; a processing block, responsive to said processing input signal, for providing a pulse triggering signal; a pulse forming and triggering block, responsive to said pulse triggering signal, for providing a pulse activating signal; and a hybrid magnet actuator, responsive to said pulse activating signal, for providing said active friction braking and for providing a retarding haptic signal used for further generating and providing the haptic feedback signal or the further haptic feedback signal or both the haptic feedback signal and the further haptic feedback signal to the user by the wireless portable device.

According further to the second aspect of the invention, the hybrid magnet actuator may comprise: a magnet yoke; a coil optionally attached to said magnet yoke, for providing a magnetic field inside of said magnet yoke in response to said pulse activating signal or in response to terminating said pulse activating signal; a permanent magnet assembly, responsive to the magnetic field generated by said coil, for providing a further magnetic field outside of said magnet yoke optionally in response to said pulse activating signal; and an anchor plate, responsive to said further magnetic field, wherein the anchor plate, when said further magnetic field is not provided, is not in a physical contact with said magnet yoke and moves freely relative to said magnet yoke, but said anchor plate, when said further magnetic field is provided, is placed in a physical contact with said magnet yoke in response to said further magnetic field and said active friction braking restricting said movement of the anchor plate relative to said magnet yoke is provided by a friction between said anchor plate and said magnet yoke thus facilitating said retarding feedback haptic applications using said active friction braking.

Further according to the second aspect of the invention, the wireless portable device may further comprise: a clock means, for providing a clock signal to the processing block. Further, the wireless portable device may further comprise: an additional input block, responsive to a further manipulation signal, for providing a further processing input signal. Still further, the processing may be responsive to the further processing input signal and to the clock signal and providing an audio input signal or a video input signal or both the audio input signal and the video input signal. Yet still further, the wireless portable device may further comprise: an audio block, responsive to said audio input signal, for providing an audio signal to the user; and a display block, responsive to said video input signal, for providing a video signal to the user.

Still further according to the second aspect of the invention, the wireless portable device may further comprise: a haptic feedback means, responsive to the retarding haptic signal, for providing the further haptic feedback signal to the user.

According further to the second aspect of the invention, the wireless portable device may further comprise: a device power supply, for providing an electric power to the pulsed forming and triggering block.

According still further to the second aspect of the invention, the wireless portable device may be a communication device, a mobile phone, a multimedia terminal, a camera, a PDA-device or a gaming device.

According to a third aspect of the invention, a method for providing a haptic feedback signal or a further haptic feedback signal or both the haptic feedback signal and the further haptic feedback signal to a user by a wireless portable device using active friction braking of a hybrid magnet actuator, said actuator being a part of said wireless portable device, comprises the steps of: applying a manipulation signal to a manipulation input block of said wireless portable device and optionally a further manipulation signal to an additional input block of said wireless portable device; providing a processing input signal to a processing block, in response to said manipulation signal and optionally providing a further processing input signal in response to said further manipulation signal; providing a pulse triggering signal to a pulse forming and triggering block by a processing block in response to said processing input signal and optionally in response to said further processing input signal; providing a pulse activating signal to said permanent magnet actuator in response to said pulse triggering signal; and providing by said permanent magnet actuator said active friction braking used for further generating and providing the haptic feedback signal or the further haptic feedback signal or both the haptic feedback signal and the further haptic feedback signal to the user by the wireless portable device.

According further to the third aspect of the invention, the processing input signal may be generated by a sensor block responding to a sensor signal which is generated in response to said manipulation signal by the manipulation input block, and wherein the further processing input signal is generated by an additional input block.

Further according to the third aspect of the invention, after the step of providing the processing input signal, the method may further comprise the step of: determining by the processing block for every clock pulse provided to the processing block by the clock means whether a retarding condition is met based on a predetermined criterion.

Still further according to the third aspect of the invention, the step of providing a pulse triggering signal to a pulse forming and triggering block may be performed if said retarding condition is met based on the predetermined criterion.

According further to the third aspect of the invention, after the step of providing said pulsed friction braking by said hybrid magnet actuator, the method may further comprise the steps of: providing a retarding haptic signal to the manipulation input block or to a haptic feedback block or to both the manipulation input block and the haptic feedback block; and providing the haptic feedback signal to the user by the manipulation input block or the further haptic feedback signal to the user by the haptic feedback block or providing to the user both the haptic feedback signal and the further haptic feedback signal.

According still further to the third aspect of the invention, the wireless portable device may be a mobile device or a mobile phone.

The main advantage of the present invention is a low power consumption of the haptic hybrid magnet actuator used in the wireless portable device (e.g., mobile device, mobile phone) compared to the prior art solutions, such as, e.g., using electromagnetic brakes, roller brakes, etc. as haptic actuators. Another advantage compared to the prior art is a small size of the hybrid magnet actuator, according to the present invention.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

Figure 1:
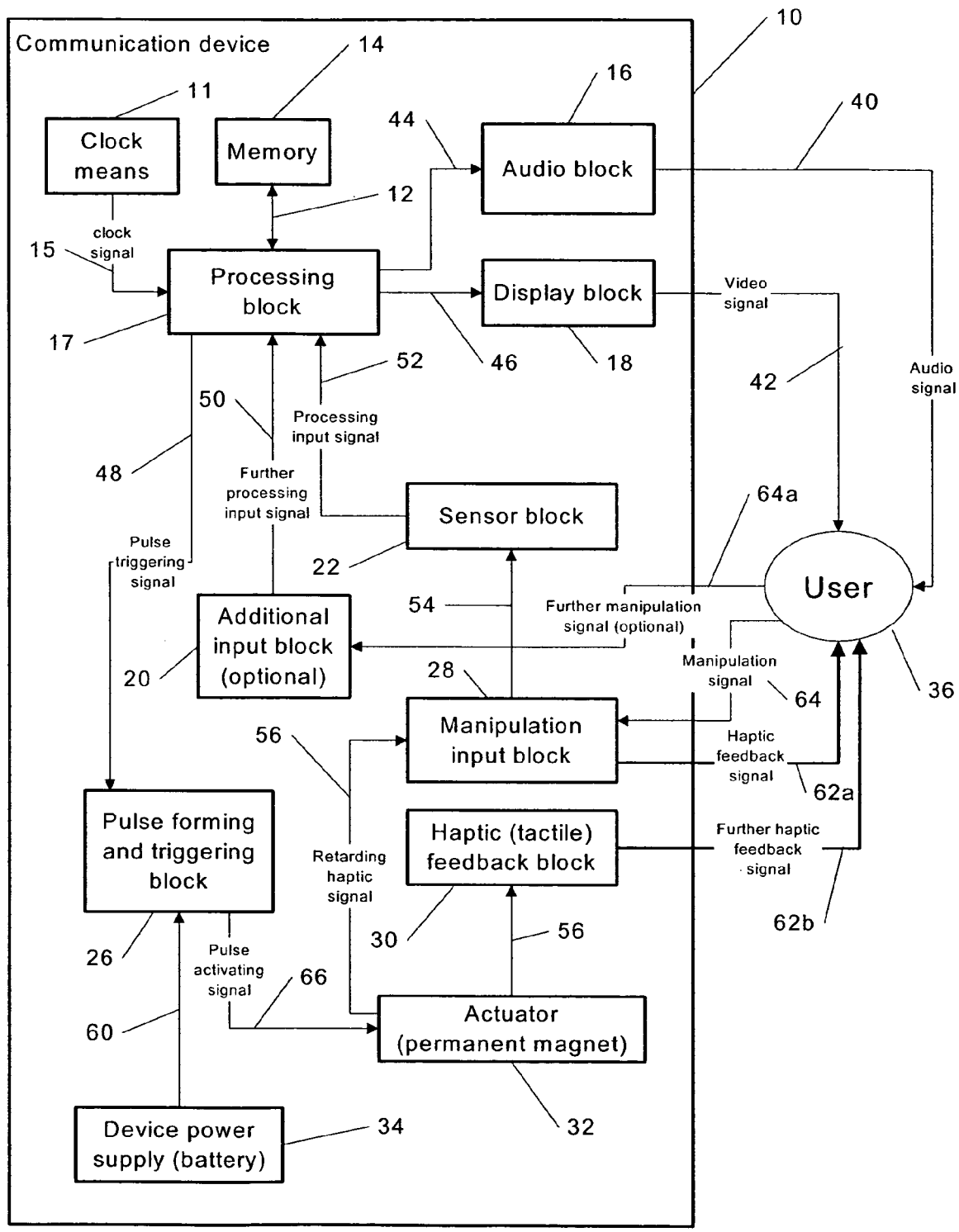
FIG. 1 is a block diagram representing an example of a wireless portable device utilizing a hybrid magnet actuator for a retarding feedback haptic application using active friction braking, according to the present invention.

The present invention provides a novel method for providing a haptic feedback to a user of a wireless portable device (e.g., a mobile gaming device, a mobile phone, a multimedia terminal, a camera or a PDA-device, etc.) utilizing a hybrid magnet with active friction braking as an actuator.

According to the present invention, such a novel hybrid magnet actuator uses a displacement of a permanent magnet assembly relative to a magnet yoke to cause another displacement of said magnet yoke relative to an anchor plate (made from a strong magnetic material, e.g., Fe), said displacements are achieved internally by means of a coil arranged so it affects the displacement of a permanent magnet assembly within said magnet yoke. A magnetic field generated by an electric current pulse of a specific direction flowing in the coil displaces the permanent magnet assembly from one position to another relative to said magnet yoke. For example, in one LOCKED or ON position (e.g., when said electric current pulse of a certain direction has been applied to said coil) a magnetic flux produced by the permanent magnet assembly passes through both the magnet yoke and the anchor plate, which facilitates a physical contact force engaging said magnet yoke and said anchor plate. In an alternative OFF or OPEN position (e.g., when said certain electric current pulse of another direction has been applied to said coil) the magnetic flux produced by the permanent magnet assembly passes only through the magnet yoke and does not substantially flow through the anchor plate which thus does not engage (no physical contact force) the magnet yoke.

Furthermore, according to the present invention, if the anchor plate is moving (e.g., linearly or rotationally) relative to the magnet yoke during the OFF or OPEN period, then appropriate electric current pulses, e.g., two-way electric pulses (various modes of operation are discussed below), that are applied to the coil brings said magnet yoke and said anchor plate in a brief physical contact thus causing a friction braking action between them during the transition period, typically during the duration of the electric pulse. Complex haptic retarding braking action can be generated by using a multitude of these transition period braking pulses.

According to the present invention, said hybrid magnet actuator can operate in different modes, either bistable or monostable, utilizing electric current pulses of the same direction, of different directions, of different pulse widths, of different pulse repetition rate etc., which are discussed below in detail.

Thus the construction of the magnet actuator, according to the present invention, does not need an external actuator for a positional change of the permanent magnet assembly to engage the brake force, this change is achieved by the electric current in the internal coil, and therefore, the device is fully enclosed.

Furthermore, according to the present invention, the invented magnet actuator utilizing pulsed friction braking can be utilized as an element to produce retarding haptic feedback sensations to a user of a small mobile device such as a mobile gaming device or a mobile phone. For example, the permanent magnet actuator can be used to retard the rotation of the rotator (e.g., anchor plate) at desired points and to provide a haptic feedback to the user, e.g., when browsing a list of names and pointing out to the user when a name is passed (e.g., an ON-pulse and an OFF-pulse) and to lock the rotation at the end of the list (e.g., an ON-pulse).

The present invention has the advantage over the prior art of consuming energy only to move the permanent magnet assembly relative to the magnet yoke. No energy is consumed when the anchor plate is moving freely or kept engaged. Another advantage relative to the prior art is a small size. The permanent magnet assembly itself generates the flux needed for retardation and only a small coil is needed to produce a small amount of energy at intervals to change the permanent magnet assembly position relative to the magnet yoke. Furthermore, in a preferred embodiment of the present invention, the relative movement of the magnet yoke and the anchor plate is accomplished by displacing the anchor plate while keeping the magnet yoke in a static position. However, in an alternative implementation, said relative movement can be implemented by displacing the magnet yoke while keeping the anchor plate in a static position.

FIG. 1 is a block diagram representing one example among many others of a wireless portable device (e.g., a mobile gaming device or a terminal or a mobile phone) 10 utilizing a hybrid magnet actuator 32 for a retarding feedback haptic application using active friction braking, according to the present invention. Said device 10 provides a haptic feedback signal 62a or a further haptic feedback signal 62b or both signals 62a, 62b to a user 36. The haptic feedback application of the device 10 is described below.

A manipulation input block 28, in response to a manipulation signal 64 from a user 36, provides a sensor signal 54 to a sensor block 22. Said manipulation signal 64 is a user command signal to the device 10 to perform a certain operation (e.g., scroll a list name, etc.). The manipulation input block 28 can be implemented in a variety of ways including but not limited to being a button, a touch screen, a press switch of a rotator, a voice input, etc. The sensor block 22 is implemented, e.g., as a position detector and detects the change in the position, motion and/or other characteristics of the manipulation input block 28 imbedded in the sensor signal 54 which describes said change. Then in response to the signal 54, the sensor block 22 provides a processing input signal 52 to the processing block 17. As an option, the user 36 can provide a further manipulation signal 64a (similar to the signal 64) to an additional input block 20 (similarly implemented as a button, a touch screen, a press switch of a rotator, a voice input, an accelerator sensor, or a grip force sensor, etc.) which provides a further processing input signal 50 to the processing block 17.

The processing block 17, in response to said processing input signal 52, optionally to said further processing input signal 50 and to a clock signal 15 from a clock means 11, generates a pulsed triggering signal 48 by determining for every clock pulse of the clock signal 15 whether a retarding condition is met based on a predetermined criterion. The pulse forming and triggering block 26, in response to said pulse triggering signal 48, generates and provides the pulse activating signal 66 to coils of a permanent magnet actuator 32. The performance of the hybrid magnet actuator 32 is briefly described above and is described below in detail following discussions of FIGS. 2a and 2b. The hybrid magnet activator 32, in response to said pulse activating signal 66, provides said active friction braking and further provides a retarding haptic signal 56 to the manipulation input block 28 or to a haptic feedback block 30 or to both the manipulation input block 28 and the haptic feedback block 30. Finally, the haptic feedback signal 62a is provided to the user 36 by the manipulation input block 28 or the further haptic feedback signal 62b is provided to the user 36 by the haptic feedback block 30 or both the haptic feedback signal 62a and the further haptic feedback signal 62b are provided to the user 36. For example, the haptic feedback signal 62a is a resistive (braking) force counteracting the manipulation signal 64 and the further haptic feedback signal 62b can be a vibration.

The additional power needed for operating the wireless portable device 10 in a haptic feedback mode is mostly determined in the example of FIG. 1 by a power provided by the device power supply (typically a battery) 34 to the pulse forming and triggering block 26. Other blocks assisting the implementation of the haptic feedback mode of operation of the wireless portable device 10 of FIG. 1, include a memory 14 for storing calibration and predetermined criterion information, an audio block 16, which, in response to a standard audio input signal 44 optionally provided to the block 16 by the processing block 17, provides an audio signal 40 to the user 36 and a display block 18, which in response to said video input signal 46 provided to the block 18 by the processing block 17, provides a video signal 42 to the user 36. Signals 42 and 40 can be useful to the user 36 for verifying received haptic feedback information (signals 62a and 62b) and making a decision for applying the manipulation signal 64 and the further manipulation signal 64a, respectively.

There are many scenarios for operating the wireless portable device 10 of FIG. 1 in a haptic feedback mode. The following simple example can illustrate the performance of the wireless portable device 10 such as a mobile phone. The user 36 can count the items just by following the haptic feedback signal 62a of the sense of feeling how many items have come down/up the list. For example the user 36 wants to make a call and has opened the phone book shown on the display block 18. The display shows the following list:

1. mother
2. father
3. sister
4. brother
5. best friend
6. worst enemy

The user 36 wants to call the best friend. The best friend is the 5$^{th}$ on the list, so the user 36 turns the manipulation input block 28 (rotator, roller, slide, ball) so that the user 36 feels five breaks (e.g., lightenings of friction) without looking at the screen (display block 18). The screen changes to the 5th item. Now the user 36 can easily double check the 5th item and make extra turn, if needed, based on the screen's information. The user 36 does not need to look at the screen (block 18) when searching, but only glance at the end.

Another simple scenario: the user presses the roller wheel (block 28) thus selecting a brake force which stays "on" as long as the network is searching for a connection. As the connection is made, the roller wheel gets loose (which is haptically sensed by the user 36) and the user 36 takes the phone to his/her ear and starts conversation.

Figure 2A:
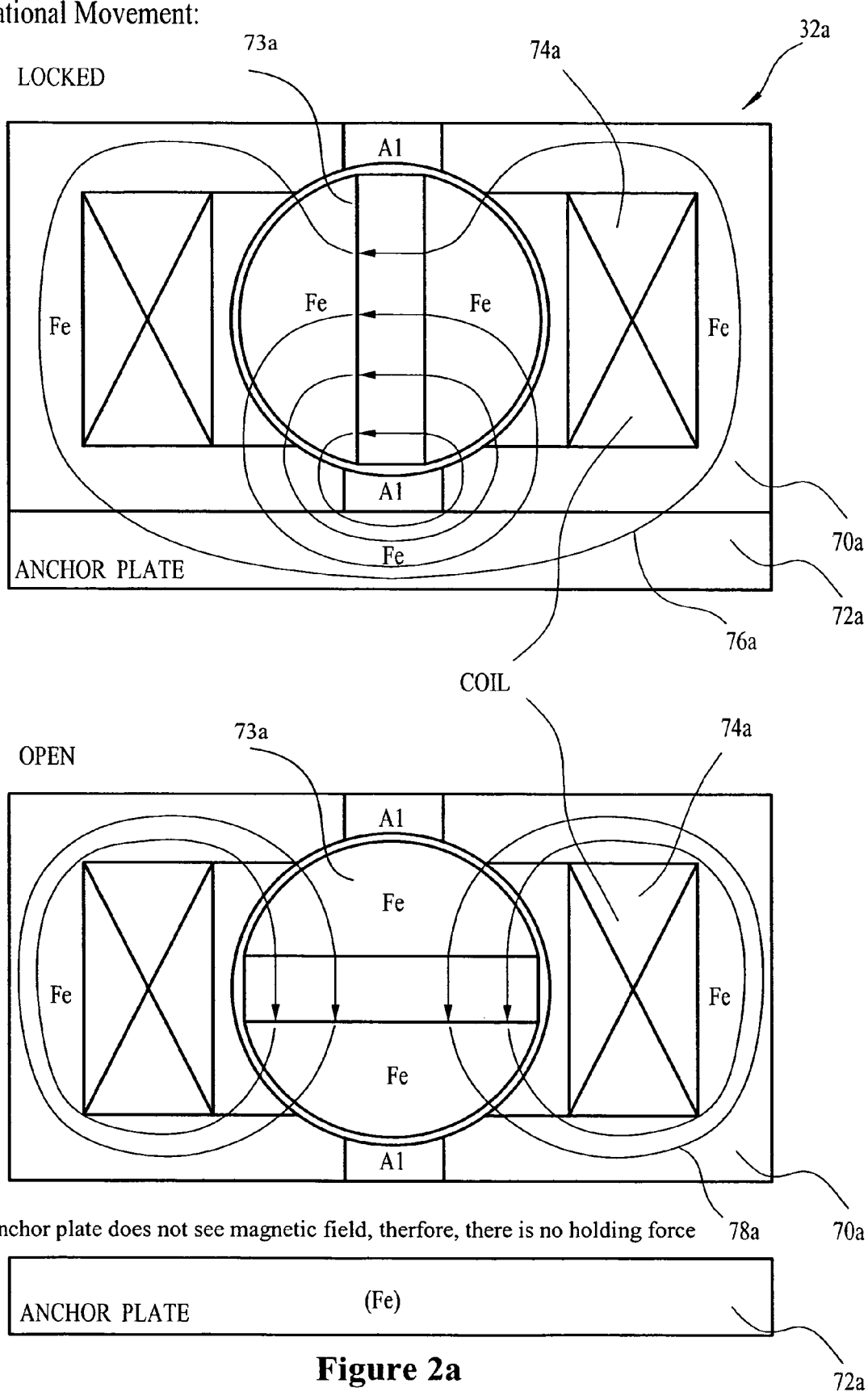
FIGS. 2a and 2b show examples of hybrid magnet actuators for a retarding feedback haptic application using active friction braking based on rotational and linear movement of a permanent magnet assembly, respectively, according to the present invention.
Figure 2B:
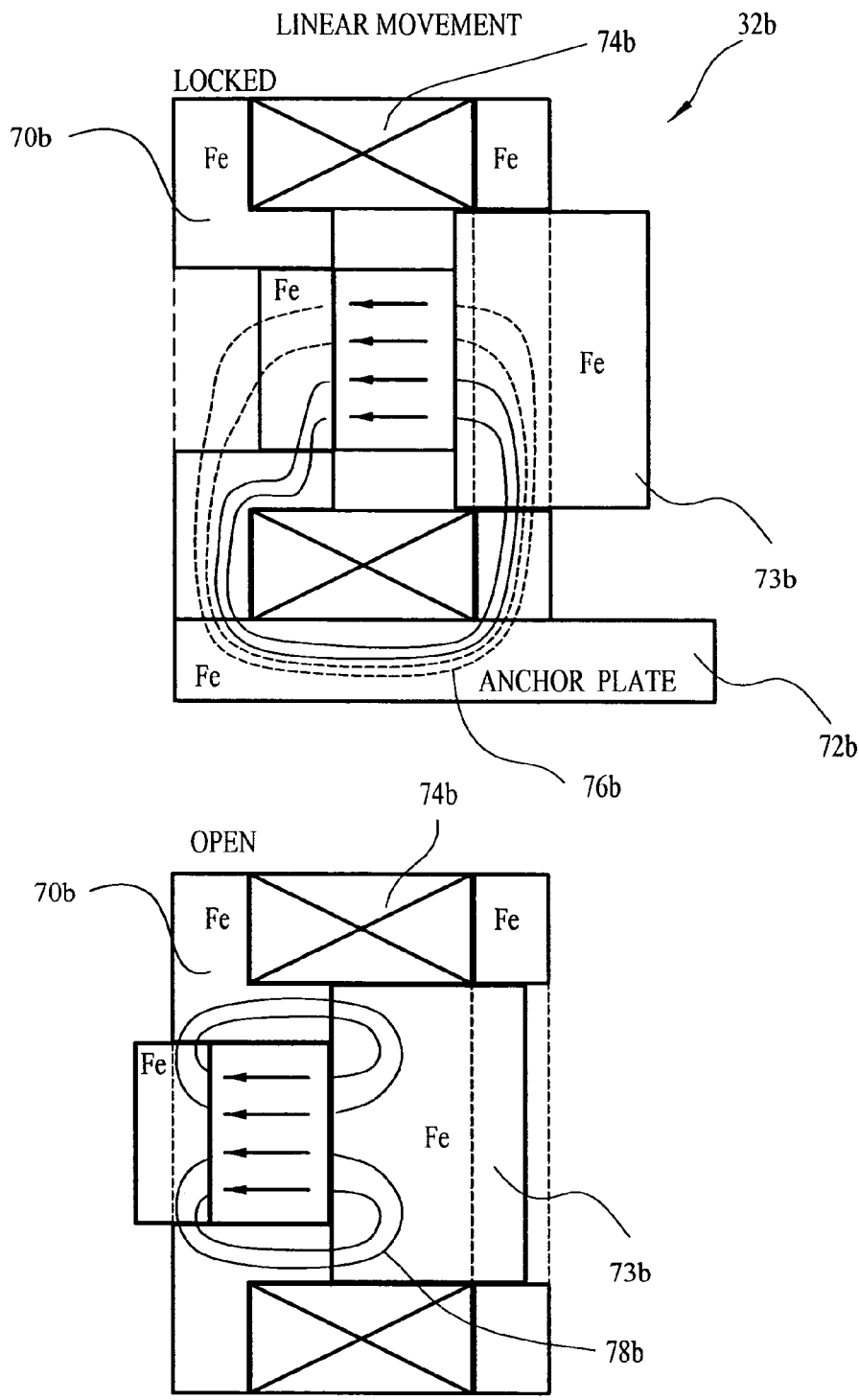
Figure 2B:
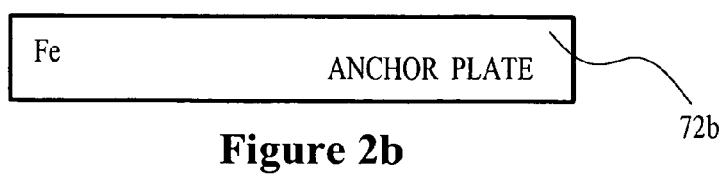

FIGS. 2a and 2b show examples among others of hybrid magnet actuators 32a and 32b for a retarding feedback haptic application using said active friction braking between anchor plates 72a and 72b and the corresponding surfaces of the magnet yokes 70a and 70b based on rotational (FIG. 2a) and linear (FIG. 2b) movement of corresponding permanent magnet assemblies 73a and 73b relative to the corresponding magnet yokes 70a and 70b, according to the present invention.

As discussed above, the permanent magnet assemblies 73a and 73b, comprising a permanent magnet or magnets, provide (by moving to the corresponding appropriate positions relative to the magnet yokes 70a and 70b in response to the magnetic field generated by coils 74a and 74b, respectively) corresponding further magnetic fields 76a and 76b outside of said magnet yokes 70a and 70b in certain positions of the permanent magnet assembly 73a or 73b, respectively.

The permanent magnet assembly 73a can be made to rotate from a stable position OPEN to another stable position LOCKED and vice versa by applying a current pulse to the coil 74a of a certain polarity and of sufficient magnitude to align the direction of the permanent magnetic field, and thus the permanent magnet assembly 73a itself, with the magnetic field produced by the coil 74a during the current pulse.

The permanent magnet assembly 73b can be made to move from a stable position OPEN to another stable position LOCKED and vice versa by applying a current pulse to the coil 74b of a certain polarity and of sufficient magnitude to move the permanent magnet assembly 73b. The magnetic field produced by the coil 74b will either attract or repulse the field of the permanent magnet assembly 73a and thus the permanent magnet assembly 73b itself will be attracted to the LOCKED position or repulsed to the OPEN position.

Suitable stops can be arranged to precisely fix the OPEN and LOCKED positions. In the case of a rotational movement, a stop can advantageously be arranged with a slight position bias in order to pre-determine the turning direction and speed up the turning between the two positions.

As shown in FIGS. 2a and 2b, the anchor plates 72a and 72b are located in the vicinity of the armature but not fixed to the corresponding magnet yokes 70a and 70b. Specifically, in the LOCKED or ON positions in FIGS. 2a and 2b, respectively (see the upper portions of FIGS. 2a and 2b), and, in response to the corresponding magnetic fields 76a and 76b provided by the corresponding permanent magnet assemblies 73a and 73b in said LOCKED positions, the anchor plates 72a and 72b facilitate friction braking (and the retarding haptic signal 56, see FIG. 1) by engaging the anchor plates 72a and 72b with the corresponding magnet yokes 70a and 70b. Moreover, in the OPEN or OFF) positions in FIGS. 2a and 2b, respectively (see low portions of FIGS. 2a and 2b), when no magnetic fields 76a and 76b are provided by the corresponding permanent magnet assemblies 73a and 73b, the anchor plates 72a and 72b disengage from the physical contact with the corresponding magnet yokes 70a and 70b and do not provide said friction braking. The anchor plates 72a and 72b are made from a strong magnetic (ferromagnetic) material, e.g., Fe, and the magnet yokes 70a and 70b comprise both low and high reluctance magnetic material (typically two low reluctance parts and in between them a high reluctance part, e.g. made of aluminum, see FIG. 2a), according to the present invention.

As mentioned above, according to the present invention, said hybrid magnet actuators 32a and 32b can operate in different modes utilizing various types of electric current pulses as discussed now in detail.

A basic form of operation of said hybrid magnet actuator 32a or 32b is bi-stable, so that a change from one position (posture) of the permanent magnet assembly 73a or 73b to another position needs one electric pulse (pulsed activating signal 66 of FIG. 1) provided to the corresponding coil 74a or 74b but both positions (LOCKED and OPEN positions) are stable and cause no energy consumption. In a preferred implementation scenario, according to the present invention, an electric pulse of a certain polarity brings said permanent magnet assembly 73a or 73b to a stable LOCKED position (causing friction braking between corresponding anchor plate 72a or 72b and the corresponding magnet yoke 70a or 70b) and an electric pulse of the opposite polarity brings said permanent magnet assembly 73a or 73b to a stable OPEN position (no friction braking).

In an alternative implementation, according to the present invention, said two electric pulses corresponding to LOCKED and OPEN positions, can be of the same polarity but having two different predetermined pulse widths: the pulse with the first pulse width moves the permanent magnet assembly 73a or 73b to the stable LOCKED position and the pulse with the second pulse width moves the permanent magnet assembly 73a or 73b to the stable OPEN position.

In another implementation, according to the present invention, said hybrid magnet actuators 32a and 32b can be made to be mono-stable. For example, when there is no electric current pulse (pulsed activating signal 66 of FIG. 1) provided to the corresponding coil 74a or 74b, the magnet assembly is in one position. When the appropriate electric pulse is provided to the corresponding coil 74a or 74b, said hybrid magnet actuator 32a or 32b switches to the other position. However, after said electric pulse is terminated (no electric current through the coils 74a or 74b), the corresponding hybrid magnet actuator 32a or 32b automatically switches back to the previous position, wherein said switching back can be facilitated by a predetermined-by-design magnetic unbalance of the corresponding hybrid magnet actuators 32a or 32b or using a small spring.

In another further alternative implementation, according to the present invention, said hybrid magnet actuators 32a and 32b can be made mono-stable in an intermediate position (e.g., applying a smaller brake force between the anchor plate 72a or 72b and the corresponding magnet yoke 73a or 73b) and applying the electric pulse to the corresponding coil 74a or 74b causes decreasing or increasing of the active friction braking force depending on the polarity (direction of the electric current) of said electric pulse.

Figure 3:
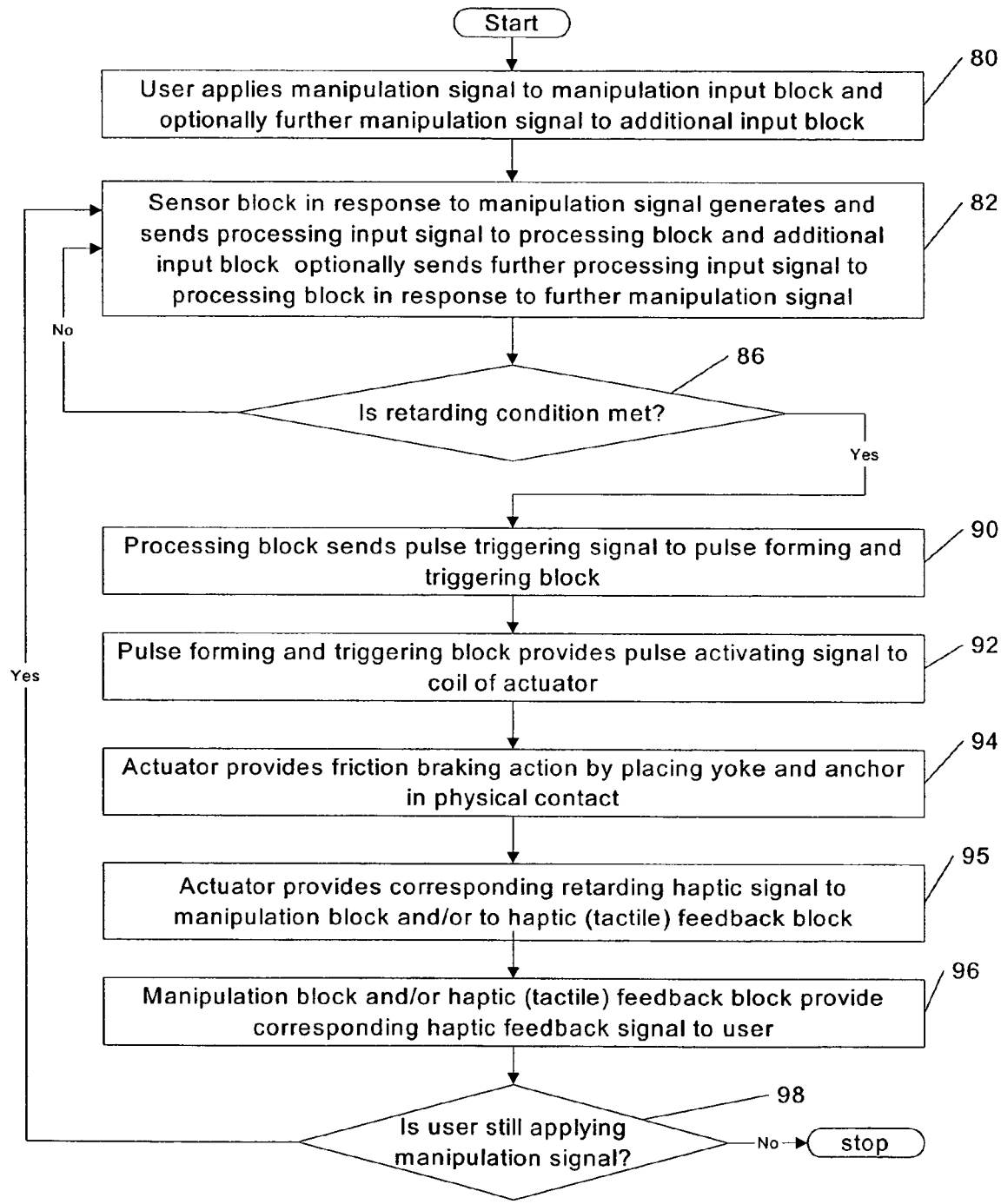
FIG. 3 is a flow chart describing an example of performance of a wireless portable device utilizing a hybrid magnet actuator for a retarding feedback haptic application using active friction braking, according to the present invention.

FIG. 3 is a flow chart describing a performance example of the wireless portable device 10 of FIG. 1 utilizing the hybrid magnet actuator 32 for the retarding feedback haptic application using said active friction braking, according to the present invention.

The flow chart of FIG. 3 represents only one possible scenario among many others. In a method according to the present invention, in a first step 80, the user 36 applies the manipulation signal 64 to the manipulation input block 28 and optionally the further manipulation signal 64a to the additional input block 20. In a next step 82, the sensor block 22, in response to the manipulation signal 64, generates and sends the processing input signal 52 to the processing block 17 and the additional input block 20 optionally sends the further processing input signal 50 to the processing block 17 in response to the further manipulation signal 64a. In a next step 86, it is determined by the processing block 17 for every clock pulse of the clock signal 15 provided to the block 17 by the clock means 11, based on the processing input signal 52 and optionally on the further processing input signal 50, whether the retarding condition is met based on the predetermined criterion. If that is not the case, the process goes back to step 82. If, however, the retarding condition is met, in a next step 90, the processing block 17 sends the pulse triggering signal 48 to the pulse forming and triggering block 26.

In a next step 94, the hybrid magnetic actuator 32, in response to the pulse triggering signal 48, provides the friction braking action by placing the magnet yokes 70a or 70b and the corresponding anchor plate 72a or 72b in the physical contact. In a next step 95, the hybrid magnetic actuator 32 provides the retarding haptic signal 56 to the manipulation block 28 and/or to the haptic feedback block 30. In a next step 96, the manipulation block 28 and/or haptic feedback block 30 provide corresponding haptic feedback signals 62a and/or 62b to the user 36.

In a next step 98, it is determined whether the user 36 is still applying the manipulation signal 64 or the manipulation signal 64a. If that is not the case, the process stops. If, however, the user 36 is still applying the manipulation signal 64 or the manipulation signal 64a, the process returns to step 82.

What is claimed is:

1. A hybrid magnet actuator, comprising:
    a magnet yoke;
    a coil, for providing a magnetic field inside of said magnet yoke in response to an electric current or in response to terminating said electric current;
    a permanent magnet assembly, responsive to the magnetic field generated by said coil, for providing a further magnetic field outside of said magnet yoke; and
    an anchor plate, responsive to said further magnetic field, wherein the anchor plate, when said further magnetic field is not provided, is not in a physical contact with said magnet yoke and moves freely relative to said magnet yoke, but said anchor plate, when said further magnetic field is provided, is placed in a physical contact with said magnet yoke in response to said further magnetic field and active friction braking restricting said movement of the anchor plate relative to said magnet yoke is provided by a friction between said anchor plate and said magnet yoke for facilitating retarding feedback haptic applications using said active friction braking,
    wherein said hybrid magnet actuator is configured to be used with a wireless portable device.

2. The permanent magnet actuator of claim 1, wherein said electric current is a pulsed electric current.

3. The permanent magnet actuator of claim 1, wherein said permanent magnet assembly is configured to move relative to said magnet yoke in response to said electric current or in response to terminating said electric current.

4. The permanent magnet actuator of claim 3, wherein said permanent magnet assembly is configured to move relative to said magnet yoke linearly or rotationally.

5. The permanent magnet actuator of claim 1, wherein said permanent magnet assembly is configured to move relative to said magnet yoke between two stable positions, wherein in a first position of said two stable positions the permanent magnet assembly is configured not to provide the further magnetic field and in a second position of said two stable positions the permanent magnet assembly is configured to provide the further magnetic field.

6. The permanent magnet actuator of claim 5, wherein said permanent magnet assembly is configured to move to the first position of said two stable positions when said electric current has a predetermined direction and said permanent magnet assembly is configured to move to the second position of said two stable positions when said electric current has a direction opposite to said predetermined direction.

7. The permanent magnet actuator of claim 5, wherein said permanent magnet assembly is configured to move to the first position of said two stable positions when said electric current has a predetermined pulse width and said permanent magnet assembly is configured to move to the second position of said two stable positions when said electric current has a further predetermined pulse width which is different from the predetermined pulse width.

8. The permanent magnet actuator of claim 1, wherein said permanent magnet assembly is configured to stay in one stable position relative to said magnet yoke when said electric current is not applied, and is configured to return to said one stable position when said electric current is applied in response to terminating said electric current.

9. The permanent magnet actuator of claim 8, wherein said permanent magnet assembly is configured to stay in one stable position relative to said magnet yoke and for providing a predetermined amount of said active friction braking, such that when said current is applied in a predetermined direction, said active friction braking is increased, and when said electric current is applied in a direction opposite to said predetermined direction, said active friction braking is decreased.

10. The permanent magnet actuator of claim 1, wherein said anchor plate is configured to move freely relative to said magnet yoke in a rotational fashion, or said anchor plate is configured to move freely relative to said magnet yoke in a linear fashion.

11. The hybrid magnet actuator of claim 1, wherein the anchor plate is made from a magnetic material or from a ferromagnetic material.

12. The hybrid magnet actuator of claim 1, wherein said hybrid magnet actuator is a part of a wireless portable device.

13. The hybrid magnet actuator of claim 12, wherein said hybrid magnet actuator is configured to provide a retarding haptic signal indicative of said active friction braking.

14. The hybrid magnet actuator of claim 13, wherein said wireless portable device, in response to said retarding haptic signal, is configured to provide a haptic feedback signal or a further haptic feedback signal or both the haptic feedback signal and the further haptic feedback signal and is responsive to at least one of: a manipulation signal and a further manipulation signal.

15. The hybrid magnet actuator of claim 14, wherein said manipulation signal or said further manipulation signal is determined using a video signal or an audio signal or both the video signal and the audio signal from the wireless portable device.

16. The hybrid magnet actuator of claim 15, wherein the haptic feedback signal or the further haptic feedback signal or both the haptic feedback signal and the further haptic feedback signal provide a braking sensation.

17. The hybrid magnet actuator of claim 12, wherein said wireless portable device is one of a communication device, a mobile phone, a multimedia terminal, a camera, a personal digital assistant device and a gaming device.

18. A wireless portable device, comprising a hybrid magnet actuator which comprises:
a magnet yoke;
a coil, for providing a magnetic field inside of said magnet yoke in response to said pulse activating signal or in response to terminating said pulse activating signal;
a permanent magnet assembly, responsive to the magnetic field generated by said coil, for providing a further magnetic field outside of said magnet yoke; and an anchor plate, responsive to said further magnetic field, wherein the anchor plate, when said further magnetic field is not provided, is not in a physical contact with said magnet yoke and moves freely relative to said magnet yoke, but said anchor plate, when said further magnetic field is provided, is placed in a physical contact with said magnet yoke in response to said further magnetic field and active friction braking restricting said movement of the anchor plate relative to said magnet yoke is provided by a friction between said anchor plate and said magnet yoke for facilitating retarding feedback haptic applications using said active friction braking.

19. The wireless portable device of claim 18, further comprises:
a manipulation input block, responsive to a manipulation signal and to a retarding haptic signal, configured to provide a haptic feedback signal and configured to provide a sensor signal;
a sensor block, responsive to the sensor signal, configured to provide a processing input signal; and
a processing block, responsive to said processing input signal, configured to provide a pulse triggering signal;
a pulse forming and triggering block, responsive to said pulse triggering signal, configured to provide a pulse activating signal, wherein
said hybrid magnet actuator is responsive to said pulse activating signal, and configured to provide said active friction braking for providing said retarding haptic signal for providing said haptic feedback signal.

20. The wireless portable device of claim 19, further comprising:
a clock means, for providing a clock signal to the processing block.

21. The wireless portable device of claim 20, further comprising:
an additional input block, responsive to a further manipulation signal, for providing a further processing input signal.

22. The wireless portable device of claim 21, wherein the processing block is responsive to the further processing input signal and to the clock signal and for providing an audio input signal or a video input signal or both the audio input signal and the video input signal.

23. The wireless portable device of claim 22, further comprising:
an audio block, responsive to said audio input signal, for providing an audio signal; and
a display block, responsive to said video input signal, for providing a video signal.

24. The wireless portable device of claim 18, further comprising:
a haptic feedback means, responsive to the retarding haptic signal, for providing a further haptic feedback signal.

25. The wireless portable device of claim 18, further comprising:
a device power supply, for providing an electric power to the pulsed forming and triggering block.

26. A method for providing a haptic feedback signal or a further haptic feedback signal or both the haptic feedback signal and the further haptic feedback signal by a wireless portable device using active friction braking of a hybrid magnet actuator, said hybrid magnet actuator being a part of said wireless portable device, comprising:
applying at least one of:
a manipulation signal to a manipulation input block of a wireless portable device, and
a further manipulation signal to an additional input block of said wireless portable device;
providing to a processing block at least one of:
a processing input signal, in response to said manipulation signal, and
a further processing input signal in response to said further manipulation signal;
providing a pulse triggering signal to a pulse forming and triggering block by a processing block in response to said at least one of:
said processing input signal, and
said further processing input signal;

providing a pulse activating signal to a permanent magnet actuator of said wireless device in response to said pulse triggering signal; and providing by a permanent magnet actuator an active friction braking for providing said haptic feedback signal or said further haptic feedback signal or both the haptic feedback signal and the further haptic feedback signal by the wireless portable device, wherein the hybrid magnet actuator comprises:

a magnet yoke;

a coil, for providing a magnetic field inside of said magnet yoke in response to said pulse activating signal or in response to terminating said pulse activating signal;

a permanent magnet assembly, responsive to the magnetic field generated by said coil, for providing a further magnetic field outside of said magnet yoke; and an anchor plate, responsive to said further magnetic field, wherein the anchor plate, when said further magnetic field is not provided, is not in a physical contact with said magnet yoke and moves freely relative to said magnet yoke, but said anchor plate, when said further magnetic field is provided, is placed in a physical contact with said magnet yoke in response to said further magnetic field and active friction braking restricting said movement of the anchor plate relative to said magnet yoke is provided by a friction between said anchor plate and said magnet yoke for facilitating retarding feedback haptic applications using said active friction braking.

27. The method of claim 26, wherein the processing input signal is generated by a sensor block responding to a sensor signal which is generated in response to said manipulation signal by the manipulation input block, and wherein the further processing input signal is generated by an additional input block.

28. The method of claim 26, wherein after said providing the processing input signal, the method further comprises:

determining by the processing block for every clock pulse provided to the processing block by the clock means whether a retarding condition is met based on a predetermined criterion.

29. The method of claim 26, wherein said providing the pulse triggering signal to the pulse forming and triggering block is performed if said retarding condition is met based on the predetermined criterion.

30. The method of claim 26, wherein after said providing said active friction braking by said hybrid magnet actuator, the method further comprises:

providing a retarding haptic signal to the manipulation input block or to a haptic feedback block or to both the manipulation input block and the haptic feedback block; and providing the haptic feedback signal by the manipulation input block or the further haptic feedback signal by the haptic feedback block or providing both the haptic feedback signal and the further haptic feedback signal.

31. The method of claim 26, wherein said wireless portable device is a communication device, a mobile phone, a multimedia terminal, a camera, a personal digital assistant device or a gaming device.

32. A hybrid magnet actuator, comprising:

magnetic field holding means;

a coil, for providing a magnetic field inside of said magnetic field holding means in response to an electric current or in response to terminating said electric current;

permanent magnetic field means, responsive to the magnetic field generated by said coil, for providing a further magnetic field outside of said magnetic field holding means; and breaking means, responsive to said further magnetic field, wherein said breaking means, when said further magnetic field is not provided, is not in a physical contact with said magnetic field holding means and moves freely relative to said magnetic field holding means, but said breaking means, when said further magnetic field is provided, is placed in a physical contact with said magnetic field holding means in response to said further magnetic field and active friction braking restricting said movement of the breaking means relative to said magnetic field holding means is provided by a friction between said breaking means and said magnetic field holding means for facilitating retarding feedback haptic applications using said active friction braking, wherein said hybrid magnet actuator is configured to be used with a wireless portable device.

33. The hybrid magnet actuator of claim 32, wherein said magnetic field holding means is a magnet yoke, said permanent magnetic field means is a permanent magnet and said breaking means is an anchor plate.

* * * * *